3,132,185
IMPROVEMENT IN THE PREPARATION OF PERFLUOROALKYL IODIDES FROM TETRAFLUOROETHYLENE

Raymond E. Parsons, Wilmington, Del., assignor to E. I. du Pont de Nemours and Company, Wilmington, Del., a corporation of Delaware
No Drawing. Filed May 2, 1962, Ser. No. 191,722
12 Claims. (Cl. 260—653)

This invention relates to the production of perfluoroethyl iodide ($C_2F_5I$). It also relates to the production of longer chain perfluoroalkyl iodides having the formula $C_2F_5(CF_2CF_2)_nI$, where $n$ is an integer of 1 or greater.

It is known that perfluoroethyl iodide can be produced by the reaction of tetrafluoroethylene with iodine and iodine pentafluoride. U.S. Patent 3,006,973 to Hauptschein et al. is concerned with such a reaction, and this patent teaches that the metals aluminum, magnesium, thorium, beryllium, calcium, strontium, or the iodides thereof, can be used as catalysts for the reaction. However, Hauptschein et al. further disclose that unless a polymerization inhibitor is used, the main products of the reaction are carbon tetrafluoride and free carbon, rather than perfluoroethyl iodide. According to the teaching of this patent, the formation of carbon tetrafluoride and carbon in the absence of the polymerization inhibitor is due to undesired side reactions; thus, only small yields of the desired $C_2F_5I$ are obtained.

The present invention provides certain improvements in reactions between iodine, iodine pentafluoride, and tetrafluoroethylene. It has now been discovered that antimony trifluoride, antimony pentafluoride, and stannous fluoride (anhydrous) are outstanding catalysts for such reactions. These catalysts produce exceptionally high yields without the concurrent use of a polymerization inhibitor, and they are safer and faster than the catalysts of the prior art. Moreover, when these catalysts are employed and the mol ratio of iodine to iodine pentafluoride is selected according to the teachings of this invention, it is possible to produce either perfluoroethyl iodide or mixtures of perfluoroalkyl iodides containing substantial amounts of longer chain perfluoroalkyl iodides having the formula $$C_2F_5(CF_2CF_2)_nI$$

Prior to the present invention, it was not known that the longer chain perfluoroalkyl iodides of the formula $C_2F_5(CF_2CF_2)_nI$ could be produced by a reaction between iodine, iodine pentafluoride, and tetrafluoroethylene.

In the process of the present invention, iodine and iodine pentafluoride are introduced into a closed reactor, together with a catalytic amount of antimony trifluoride or antimony pentafluoride, or stannous fluoride. Tetrafluoroethylene is also introduced into the reactor, and if reaction is not self-initiating, gentle heating is to be used. The reaction, however, is exothermic and once it is initiated, means may be necessary to remove heat. Reaction temperatures are usually maintained in the range of 0° C. to 120° C., and the reaction is carried out under autogenous pressure.

The end products produced in the reaction are dependent upon the mol ratio of iodine to iodine pentafluoride. When the $I_2:IF_5$ ratio is at least 2:1, the end product of the reaction of the present invention is essentially perfluoroethyl iodide. The upper limit of the $I_2:IF_5$ mol ratio is not critical, but from a practical standpoint it need not exceed 5:1. When this mol ratio is at least 2:1, tetrafluoroethylene should be added in an amount of at least 5 mols for each mol of $IF_5$. Under these conditions, the reaction of the present invention proceeds as follows:

$$2I_2 + IF_5 + 5CF_2{=}CF_2 \rightarrow 5CF_3CF_2I$$

Excess tetrafluoroethylene may be used but the reaction stops after the 5 mols of the tetrafluoroethylene have reacted. Moreover, excess tetrafluoroethylene will be lost, if excess iodine is present.

If the mol ratio of $I_2:IF_5$ is less than 2:1, products of the formula $C_2F_5(CF_2CF_2)_nI$ are produced, usually in conjunction with varying amounts of $C_2F_5I$, depending on the $I_2:IF_5$ ratio. The products having the formula $$C_2F_5(CF_2CF_2)_nI$$

are produced as mixtures, and therefore there may be several values for $n$ in the same reaction product. In this embodiment of the invention, where the mol ratio of $I_2:IF_5$ is less than 2:1, the reaction does not stop after 5 mols of tetrafluoroethylene have been reacted. Moreover, as little as 1 mol of tetrafluoroethylene per mol of $IF_5$ may be used, and amounts in excess of 5 mols will enter into the reaction, thus increasing the length of the perfluoroalkyl iodide chain. Thus, the value of $n$ and the quantity of products possessing the formula $$C_2F_5(CF_2CF_2)_nI$$

vary depending upon the amount of tetrafluoroethylene added. Preferred mol ratios of tetrafluoroethylene (TFE) to $IF_5$ range from 1:1 to 20:1 thus producing compounds of the formula $C_2F_5(CF_2CF_2)_nI$, where $n$ is in the range of 1–20. However, it should be understood that neither the lower nor the upper limit on the amount of tetrafluoroethylene is critical. Any amount of tetrafluoroethylene will give some product. A mol ratio of $TFE:IF_5$ of 3:1 assures fairly complete utilization of the halogens. The selection of the upper limit of $TFE:IF_5$ is governed by the molecular weight desired in the end products.

The amount of catalyst used is also not critical. Usually it may range from about .007 to 0.2 mol per mol of iodine pentafluoride and .008 to .016 mol per mol of $IF_5$ is preferred.

The procedure for carrying out the present invention is relatively simple. For example, iodine, iodine pentafluoride, and the catalyst may be placed in an agitated pressure vessel and heated to the reaction temperature. The reaction vessel should also be equipped with means for applying cooling to the reaction mixture. The tetrafluoroethylene should be added slowly since the reaction is rather exothermic and a considerable temperature rise may occur. If tetrafluoroethylene is added, either in bulk initially or too rapidly during the reaction, the process becomes uncontrollable. The rate of tetrafluoroethylene addition is controlled mainly by the ability of the reaction equipment used to remove heat from the reaction mixture. It is also desirable to keep the temperature as low as possible since iodine pentafluoride becomes much more corrosive at higher temperatures. When a small proportion of tetrafluoroethylene is added to the halogenation mixture, there is usually an almost immediate release of heat. The pressure due to the added tetrafluoroethylene decreases as it is consumed. After the added tetrafluoroethylene has reacted, additional increments are introduced until the desired amount of tetrafluoroethylene has been added. Alternatively, the tetrafluoroethylene may be added slowly, in a continuous manner, at a rate such that the reaction temperature is maintained approximately constant by removing heat from the reaction system.

The preferred conditions for the production of perfluoroethyl iodide are a temperature of about 80° C. (±5° C.), a very slight excess of iodine (say, 1–2% based on the weight of iodine necessary to provide 2 mols of iodine per mol of iodine pentafluoride), five mols of tatrafluoroethylene, and eight millimols of catalyst ($SbF_3$ is preferred) per mol of iodine pentafluoride, and autogenous pressure. The temperature of 80° C. is preferred since, at this temperature, the best heat transfer and cooling can be obtained with ordinary water. At lower temperatures, say 60° C., the process is readily operable, but it may be necessary to resort to brine or the like to obtain sufficient cooling capacity to maintain this low temperature. At higher temperatures, say 100° C., the cooling capacity of the reaction system must be increased accordingly. Also, at higher temperatures, higher reaction pressures occur, requiring heavier equipment. These are not insurmountable obstacles, and the process can be operated anywhere within the range of 0° C. to 110° C. with properly designed equipment. Reaction temperatures above about 110° C. lead to reactions which are difficult to control.

The molar ratio of $I_1:IF_5$ is kept between 0.8:1 to 1.9:1 for the best yields of $C_2F_5(CF_2CF_2)_nI$. The preferred reacting proportions for producing mixtures of these longer chain perfluoroalkyl iodides are: 1.8 mols of iodine per mol of iodine pentafluoride, 16 millimols of catalyst ($SbF_3$ being preferred) per mol of $IF_5$ and 6.65 mols of tetrafluoroethylene per mol of $IF_5$. Preferred temperatures are in the range of 60° C. to 80° C., and autogenous pressure is used.

As previously mentioned, and $I_2:IF_5$ mol ratio of at least 2:1 produces an end product which is essentially perfluoroethyl iodide. Since this compound has a B.P. 13° C. at atmospheric pressure, it is readily separated from any non-volatile products in reaction mixture by vaporization. Occasionally, trace amounts of perfluoroethane (B.P. −79° C.) and perfluorocyclobutane (B.P. −6° C.) are vaporized along with the $C_2F_5I$. If desired, these materials can be easily distilled from the perfluoroethyl iodide.

It has also been previously mentioned that mixtures containing compounds of the formula $C_2F_5(CF_2CF_2)_nI$ vary depending on the mol ratio of $I_2:IF_5$ and the amount of tetrafluoroethylene used. When proceeding according to the preferred reaction conditions, a typical mixture will consist of perfluoroalkyl iodides $C_2F_5I$ (B.P. 13° C.), n-$C_4F_9I$ (B.P. 68° C.), n-$C_6F_{13}I$ (B.P. 119° C.), n-$C_8F_{17}I$ (B.P. 95° at 103 mm.), n-$C_{10}F_{21}I$ (B.P. 106° at 45 mm.), n-$C_{12}F_{25}I$ (B.P. 110° at 18 mm.), n-$C_{14}F_{29}I$ (B.P. 97° at 5 mm.), n-$C_{16}F_{33}I$ (B.P. 94° at 0.5 mm.) and higher products. Trace amounts of $C_2F_6$ and perfluorocyclobutane occur under some conditions.

For a clearer understanding of the invention, the following specific examples are given. These examples are intended to be merely illustrative of the invention and not in limitation thereof. Unless otherwise specified, all parts are by weight.

Examples I–VIII illustrate the preparation of $C_2F_5I$ while Examples IX–XIX illustrate the preparation of mixtures wherein compounds have the formula

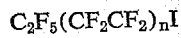

$$C_2F_5(CF_2CF_2)_nI$$

*Example I*

167.7 parts (0.66 mol) of iodine, 73.3 parts (0.33 mol) of iodine pentafluoride and 0.5 part (0.0028 mol; i.e., 8.48 millimols/mol $IF_5$) of antimony trifluoride were mixed at ambient temperature in a "Hastelloy-C" lined autoclave (2 mols of iodine and 8.48 millimols of catalyst per mol of iodine pentafluoride). The autoclave was cooled below 0° C., evacuated to remove air and heated to 80° C. with agitation. Tetrafluoroethylene was added slowly, with agitation, in small increments (2 parts initially, increased to 5 parts and then to 10 parts as the reaction proceeded) to the autoclave until a total of 192 parts had been added (one hour required). The pressure rose to about 200–250 p.s.i.g. after each addition and dropped to less than 100 p.s.i.g. in less than three minutes. The temperature rose 8 to 26° C. after each addition in about one minute and then reverted to about 80° C. until 165 parts (5 mols per mol of iodine pentafluoride) had been added. There was no temperature increase during the addition of the remaining 27 parts of tetrafluoroethylene. The pressure steadily increased with no sign of any decrease, indicating that the reaction was complete when 165 parts had been added. The reaction mass was held at 80° C. for one hour without any further reaction. After cooling, the volatile products were vented from the autoclave at 60° C. through a water scrubber and a "Drierite" (calcium sulfate) column and collected in a refrigerated receiver at −60° C. Analysis of the condensed product (397 parts) by mass spectrometer showed 98.3% perfluoroethyl iodide, 0.4% unreacted tetrafluoroethylene, 0.8% 1,2-diiodotetrofluoroethane and 0.4% perfluorocyclobutane. The noncondensed gases were collected and found to contain 28.1 parts of unreacted tetrafluoroethylene and 4.3 parts of perfluoroethyl iodide. There was no organic residue in the autoclave. The yield of pentafluoroethyl iodide was 98.5% based on the quantity of tetrafluoroethylene consumed; halogen conversion was quantitative.

*Example II*

Example I was repeated using a reaction temperature of 60° C. rather than the 80° C. reaction temperature used in Example I. Temperature increases of 11° to 44° C. were observed during the additions of tetrafluoroethylene. The condensed product (401 parts) was found to contain 97.4% perfluoroethyl iodide, 0.7% tetrafluoroethylene, 0.6% perfluorocyclobutane, 0.7% 1,2-diiodotetrafluoroethane and 0.4% of other products. The yield of perfluoroethyl iodide was 98.1% based on the tetrafluoroethylene consumed; halogen conversion was quantitative.

*Example III*

The reaction of Example I was repeated using the same quantities of reactants and reaction conditions in an ordinary steel (type 1020) autoclave. The reaction was identical to Example I. The condensed product (400 parts), contained 97.3% perfluoroethyl iodide, 0.6% 1,2-diiodotetrafluoroethane, 0.9% perfluorocyclobutane, 0.8% tetrafluoroethylene and 0.2% other products. The yield of perfluoroethyl iodide was 98% based on the tetrafluoroethylene consumed; halogen conversion was quantitative.

*Example IV*

The reaction of Example I was repeated omitting the antimony trifluoride catalyst. Temperature increases of 2° to 16° C. were observed during the tetrafluoroethylene additions. The reaction was not as rapid as Example I (two hours required) and stopped after about 50% of the required amount of tetrafluoroethylene had been added. The condensed product (244.5 parts) contained 98.5% perfluoroethyl iodide, 0.4% tetrafluoroethylene, 0.5% 1,2-diiodotetrafluoroethane and 0.5% perfluorocyclobutane. An oil residue (35 parts) remaining in the autoclave contained 94.6% 1,2-diiodotetrafluoroethane and 4.4% perfluoroethyl iodide. The yield of perfluoroethyl iodide was 98.4% based on the tetrafluoroethylene consumed; the conversion of halogen compounds was 57%.

*Example V*

The reaction of Example I was repeated substituting 2.0 parts (0.0128 mol, i.e., 38.8 millimols per mol of iodine pentafluoride) of anh. stannous fluoride for the antimony trifluoride used in Example I. Temperature rises of 8° to 26° C. were observed during the tetrafluoroethylene additions. The condensed product (404 parts) contained 96.9% perfluoroethyl iodide, 0.6% tetrafluoroethylene, 0.8% perfluorocyclobutane, 0.3% 1,2-diiodotetrafluoroethane and 1.3% other products. The yield of perfluoroethyl iodide was 99% based on the tetrafluoroethylene consumed; halogen conversion was quantitative.

Example VI

Example I was repeated using various other catalysts in place of the antimony trifluoride used in Example I. The results obtained are as follows:

| Catalyst | Amount (Parts) | Percent Yield of Perfluoroethyl Iodide |
|---|---|---|
| $CaF_2$ | 2.0 | 78 |
| $CrF_3 \cdot 3H_2O$ | 2.0 | 16 |
| $KF$ | 2.0 | 18 |
| $HF$ | 100.0 | 15 |
| $CoF_2 \cdot 2H_2O$ | 2.0 | 60 |
| $PbF_4$ | 2.0 | 39 |
| $CuF_2$ | 2.0 | 78 |
| $NiF_2 \cdot 5H_2O$ | 2.0 | 28 |
| $AgF$ (50%) | 2.0 | 73 |

Yields in the above table are based on the tetrafluoroethylene consumed, and as can be seen, none of these materials produce yields which approach 95%.

Example VII

The reaction of Example I was repeated using 2.0 parts (33.9 millimols per mol of iodine pentafluoride) of antimony trifluoride in place of the 0.5 part used in Example I. The reaction conditions and procedure were the same as Example I. The yield of perfluoroethyl iodide was the same as Example I.

Example VIII

The reaction of Example I was repeated using 73.3 parts of iodine pentafluoride (0.33 mol) and 176.1 parts of iodine (0.73 mol; i.e., 2.21 mols per mol of iodine pentafluoride, thus providing a 5% weight excess over the required 2 mols per mol of $IF_5$). The reaction condition and procedure and the products were the same as Example I except that a small organic residue (2.2 parts) was recovered from the autoclave which contained 65.6% 1,2-diiodotetrafluoroethane and 31.7% perfluoroethyl iodide. The yield of perfluoroethyl iodide was 100% based on the iodine pentafluoride used.

Since both an excess of iodine and tetrafluoroethylene were used in this example, it is not unexpected that this excess would react to form 1,2-diiodotetrafluoroethane.

Example IX

A mixture of 83.9 parts (0.33 mol) of iodine, 40.4 parts (0.182 mol; i.e., 1.813 mols iodine per mol $IF_5$) of iodine pentafluoride and 0.5 part (0.0028 mol) of antimony trifluoride (15.4 millimols per mol of $IF_5$) was prepared at ambient temperature in a "Hastelloy-C" lined autoclave. The autoclave was cooled to below 0° C., evacuated, sealed and then heated to 60° C. with agitation. Tetrafluoroethylene was added slowly in small increments (2 parts initially, increasing to 5 then 10 parts as the reaction proceeded) to the autoclave until a total of 121 parts (1.21 mols; i.e., 6.65 mols per mol of $IF_5$) of tetrafluoroethylene had been added (one hour). The reaction was rapid and exothermic throughout although the heat of reaction diminished during the later part of the reaction. The pressure dropped rapidly from 150–250 p.s.i.g. to less than 100 p.s.i.g. and the temperature rose 7° to 44° C. after each addition. Addition of tetrafluoroethylene was terminated by choice after the desired amount had been added. The reaction mass was held at 70° C. for one hour, then cooled. After cooling, the volatile products were vented from the autoclave at 60° C. through a water scrubber and a calcium sulfate drying column and condensed in a refrigerated receiver at −60° C. The noncondensed material was also collected. Analysis of the condensed volatile material (121.6 parts) by mass spectrometer indicated 95.1 mol percent $C_2F_5I$, 1.2 mol percent $C_4F_9I$, 0.5 mol percent tetrafluoroethylene and 1.0 mol percent $C_2F_6$. The noncondensed gases were found to consist of 8.0 parts of tetrafluoroethylene, 4.0 parts of $C_2F_5I$ and 3.1 parts of $C_2F_6$. The nonvolatile residue (100 parts) was washed with water and analyzed with a vapor phase chromatograph, indicating the following: $C_2F_5I$ 21.1 wt. percent, $C_4F_9I$ 28.7 wt. percent, $C_6F_{13}I$ 20.6 wt. percent, $C_8F_{17}I$ 13.0 wt. percent, $C_{10}F_{21}I$ 7.5 wt. percent, $C_{12}F_{25}I$ 4.1 wt. percent, $C_{14}F_{29}I$ 2.3 wt. percent, $C_{16}F_{33}I$ 1.1 wt. percent. Minor traces of other materials were also present. The combination of these analyses indicate the following: 96.9% of the tetrafluoroethylene is accounted for; percent yields as follows, based on tetrafluoroethylene consumed, $C_2F_5I$ 48.8%, $F(CF_2)_4I$ 15.8%, $F(CF_2)_6I$ 12.3%, $F(CF_2)_8I$ 8.4%, $F(CF_2)_{10}I$ 5.1%, $F(CF_2)_{12}I$ 2.9%, $F(CF_2)_{14}I$ 1.7%, $F(CF_2)_{16}I$ 0.9% and $C_2F_6$ 0.6%. Thus, the total yield of perfluoroalkyl iodide products was 95.8% and the total yield of products $C_2F_5(CF_2CF_2)_nI$ with $n$ greater than zero was 47.1%. Iodine consumption was quantitative.

Example X

Example IX was repeated using 83.9 parts of $I_2$ (0.33 mol), 38.5 parts of $IF_5$ (0.1735 mol; i.e., 1.903 mols iodine per mol $IF_5$) and 0.5 part of $SbF_3$ (16.2 millimols per mol of $IF_5$). Tetrafluoroethylene (140 parts, 1.40 mols, 8.07 mols per mol of $IF_5$) was added as in Example I. The products, recovered in the same manner as Example I, consisted of the following: 129.2 parts (38.9%) $C_2F_5I$, 44.2 parts (18.9%) $F(CF_2)_4I$, 24.1 parts (12.0%) $F(CF_2)_6I$, 19.7 parts (10.7%) $F(CF_2)_8I$, 13.2 parts (7.6%) $F(CF_2)_{10}I$, 9.9 parts (5.9%) $F(CF_2)_{12}I$, 5.5 parts (2.85%) $F(CF_2)_{14}I$, 5.9 parts (3.2%) $C_2F_6$ and 0.4 part of $C_2F_4$. Other products were present in traces. The total yield of perfluoroalkyl iodides, based on tetrafluoroethylene consumed, was 96.8%, the yield of $$C_2F_5(CF_2CF_2)_nI$$

was 57.9%. Iodine consumption was quantitative.

Example XI

Example IX was repeated using 83.9 parts of $I_2$ (0.33 mol), 80.8 parts of $IF_5$ (0.364 mol, i.e., 0.907 mol iodine per mol $IF_5$), and 0.5 part of $SbF_3$ (0.0028 mol, i.e., 7.7 millimols per mol $IF_5$). Tetrafluoroethylene (118 parts, 1.18 mol, i.e., 3.24 mols per mol $IF_5$) was added as in Example I. The products, recovered as in Example IX, consisted of the following: 149.9 parts (51.7%) $C_2F_5I$, 31.5 parts (15.4%) $F(CF_2)_4I$, 20.3 parts (11.6%) $F(CF_2)_6I$, 13.3 parts (8.3%) $F(CF_2)_8I$, 7.5 parts (4.9%) $F(CF_2)_{10}I$, 4.3 parts (3.0%) $F(CF_2)_{12}I$, 2.3 parts (1.6%) $F(CF_2)_{14}I$.

The total yield of perfluoroalkyl iodides, based on tetrafluoroethylene consumed, was 96.5% with a 44.9% yield of $C_2F_5(CF_2CF_2)_nI$. Iodine consumption was quantitative.

Example XII

Example IX was repeated using 83.9 parts $I_2$ (0.33 mol), 40.4 parts $IF_5$ (0.182 mol, i.e., 1.813 mols iodine per mol $IF_5$) and 5.0 parts $SbF_3$ (0.028 mol, 154 millimols per mol $IF_5$). Tetrafluoroethylene was added as in Example I (118 parts, i.e., 1.18 mols, 6.49 mols per mol $IF_5$). The products, isolated as in Example I, were as follows: $C_2F_5I$ 150 parts (54.4%), $F(CF_2)_4I$ 17.7 parts (9.1%), $F(CF_2)_6I$ 13.5 parts (8.1%), R$(CF_2)_8I$ 8.2 parts (5.3%), $F(CF_2)_{10}I$ 4.6 parts (3.2%), $F(CF_2)_{12}I$ 2.6 parts (1.9%), $F(CF_2)_{14}I$ 1.4 parts (1.1%), $C_2F_6$ 14.0 parts (9.0%) and $C_2F_4$ 5.6 parts. The total yield of perfluoroalkyl iodides, based on tetrafluoroethylene consumed, was 83.0% and the yield of $C_2F_5(CF_2CF_2)_nI$ was 28.8%. Iodine consumption was quantitative.

Example XIII

Example IX was repeated in detail except that the tetrafluoroethylene was added initially while the temperature of the reaction mixture was at 2° C. The mixture was allowed to warm up slowly and there was no visible heat of reaction below 10° C. At about 10° an exothermic reaction began with heat increases of 3 to 54°.

A total of 126 parts (1.26 mols; i.e., 15.4 mols per mol $IF_5$) were added in increments at temperatures up to 35° C. The products, recovered as in Example I, were as follows: 128 parts (41.4%) $C_2F_5I$, 20.6 parts (9.5%) $F(CF_2)_4I$, 15.1 parts (8.1%) $R(CF_2)_6I$, 13.0 parts (7.6%) $F(CF_2)_8I$, 11.1 parts (6.8%) $F(CF_2)_{10}I$, 8.6 parts (5.5%) $F(CF_2)_{12}I$, 7.3 parts (4.8%) $F(CF_2)_{14}I$ and 5.9 parts (3.9%) $F(CF_2)_{16}I$. The total yield of perfluoroalkyl iodides, based on tetrafluoroethylene consumed, was 87.5% and the yield of $C_2F_5(CF_2CF_2)_nI$ was 46.7%. Iodine consumption was quantitative.

*Example XIV*

Example IX was repeated using a reaction temperature of 93 to 118° C. 136 parts of tetrafluoroethylene (1.36 mols; i.e., 7.48 mols per mol $IF_5$) were added in increments at about 100° C. Heat increases of up to 18° were observed. The products, recovered as before, were as follows: 12 parts $C_2F_4$, 2.5 parts $C_2F_6$ (1.5%), 2.5 parts (2.0%) perfluorocyclobutane, 154.3 parts (50.6%) $C_2F_5I$, 23.6 parts (11.0%) $F(CF_2)_4I$, 11.5 parts (6.2%) $F(CF_2)_6I$, 6.4 parts (3.8%) $F(CF_2)_8I$, 3.4 parts (2.1%) $F(CF_2)_{10}I$, 1.8 parts (1.2%) $F(CF_2)_{12}I$ and 1.1 parts (0.7%) $F(CF_2)_{14}I$. The total yield of perfluoroalkyl iodides, based on tetrafluoroethylene consumed, was 75.6% and the yield of $C_2F_5(CF_2CF_2)_nI$ was 25.0%. Iodine consumption was quantitative.

*Example XV*

Example IX was repeated using 200 parts (2.00 mols; i.e., 11.0 mols per mol $IF_5$) of tetrafluoroethylene. The products, recovered as before, were as follows: 15 parts $C_2F_4$, 2 parts (0.8%) $C_2F_6$, 124 parts (27.1%) $C_2F_5I$, 35 parts (10.9%) $F(CF_2)_4I$, 23 parts (8.4%) $F(CF_2)_6I$, 23 parts (9.1%) $F(CF_2)_8I$, 20 parts (8.4%) $F(CF_2)_{10}I$, 16 parts (7.0%) $F(CF_2)_{12}I$, 11 parts (4.9%) $F(CF_2)_{14}I$ and traces of higher products. The total yield of perfluoroalkyl iodides, based on tetrafluoroethylene consumed, was 75.8% and the yield of $C_2F_5(CF_2CF_2)_nI$ was 48.7%. Iodine consumption was quantitative.

*Example XVI*

Example IX was repeated using 97 parts (0.97 mol; i.e., 5.33 mols per mol $IF_5$) of tetrafluoroethylene. The product, isolated as before, consisted of the following: 180 parts (75.5%) $C_2F_5I$, 19.2 parts (11.4%) $F(CF_2)_4I$, 6.4 parts (4.5%) $F(CF_2)_6I$, 2.6 parts (2.0%) $F(CF_2)_8I$, 1.0 part (0.8%) $F(CF_2)_{10}I$ and 0.4 part (0.3%) $F(CF_2)_{12}I$. The total yield of perfluoroalkyl iodides, based on tetrafluoroethylene consumed, was 94.5% and the yield of $C_2F_5(CF_2CF_2)_nI$ was 19.1%. Iodine consumption was quantitative.

*Example XVII*

Example IX was repeated in detail omitting the 0.5 part of antimony trifluoride. The reaction was only mildly exothermic and the pressure built up to 250 p.s.i.g., after only 30 parts (0.3 mol, ca. 1 mol per 2 mols $I_2$) had been added. Perfluoroethyl iodide was the only product which could be isolated from the reaction mixture.

*Example XVIII*

Example IX was repeated in detail substituting 2.0 parts (0.0128 mol; i.e., 70.5 millimols per mol $IF_5$) of stannous fluoride for the 0.5 part antimony trifluoride used in Example I. A total of 117 parts (1.17 mols; i.e., 6.43 mols per mol $IF_5$) of tetrafluoroethylene were added. The products, isolated as before, were as follows: 166.6 parts (61.2%) $C_2F_5I$, 12.1 parts (8.2%) $F(CF_2)_4I$, 10.0 parts (6.2%) $F(CF_2)_6I$, 8.5 parts (5.8%) $F(CF_2)_8I$, 6.4 parts (4.5%) $F(CF_2)_{10}I$, 4.18 parts (3.5%) $F(CF_2)_{12}I$, 3.7 parts (2.8%) $F(CF_2)_{14}I$, 2.9 parts (1.3%) $F(CF_2)_{16}I$, 2.7 parts (1.8%) $C_2F_6$ and 7.0 parts $C_2F_4$. The total yield of perfluoroalkyl iodides was 94.5% and the yield of $C_2F_5(CF_2CF_2)_nI$ was 33.3%, based on tetrafluoroethylene consumed. Iodine consumption was quantitative.

*Example XIX*

Example IX was repeated in detail using 0.5 part (2.307 millimols; i.e., 13.7 millimols per mol $IF_5$) of antimony pentafluoride as the catalyst. A total of 146 parts (1.46 mols; i.e., 8.01 mols per mol $IF_5$) of tetrafluoroethylene were added. The products, isolated as before, were: 102.2 parts (28.5%) $C_2F_5I$, 20.5 parts (8.1%) $F(CF_2)_4I$, 27.0 parts (12.5%) $F(CF_2)_6I$, 23.2 parts (11.7%) $F(CF_2)_8I$, 17.7 parts (9.4%) $F(CF_2)_{10}I$, 11.5 parts (6.3%) $F(CF_2)_{12}I$, 8.6 parts (4.9%) $F(CF_2)_{14}I$, 5.4 parts (4.1%) $F(CF_2)_{16}I$, 6.0 parts (3.0%) $C_2F_6$ and 0.2 part $C_2F_4$. The total yield of perfluoroalkyl iodide, based on tetrafluoroethylene consumed, was 85.6% and the yield of $C_2F_5(CF_2CF_2)_nI$ was 56.9%. Iodine consumption was quantitative.

The perfluoroalkyl iodides produced according to this invention are known materials. Perfluoroethyl iodide is usually converted to longer chain perfluoroalkyl iodides which are useful for preparing surface-active agents. Moreover, if desired, the longer chain perfluoroalkyl iodides may be converted to perfluoro acids which are also well-known surface-active agents (see U.S.P. 2,567,011).

All of the materials used in the process of the present invention are commercially available materials. Commercial tetrafluoroethylene often contains a polymerization inhibitor, usually d-limonene. This inhibitor does not function in the same manner as $CF_2ClCCl_2I$ which has been used as an inhibitor for the reaction of tetrafluoroethylene with iodine and iodine pentafluoride. The primary function of d-limonene is to prevent polymerization by oxygen during storage. The inhibitor may be left in the tetrafluoroethylene since it makes handling less hazardous but it does consume some of the halogen reagents. It can be removed by passing the tetrafluoroethylene over silica-gel, but it usually is preferable not to remove the inhibitor.

Iodine pentafluoride is very corrosive, particularly to metals, if anhydrous conditions are not maintained. Under anhydrous conditions, corrosion is not severe and metals such as stainless steel, "Hastelloy-C," "Inconel," and ordinary steel can be used in the reaction equipment. Steel is more severely attacked than the others, but not enough to prevent its use.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. In the reaction of iodine, iodine pentafluoride, and tetrafluoroethylene to produce perfluoroalkyl iodides, the improvement which comprises conducting said reaction in the presence of a catalyst selected from the group consisting of antimony pentafluoride, antimony trifluoride, and ahydrous stannous fluoride.

2. The process of claim 1 wherein the catalyst is antimony pentafluoride.

3. The process of claim 1 wherein the catalyst is antimony trifluoride.

4. The process of claim 1 wherein the catalyst is anhydrous stannous fluoride.

5. The reaction of iodine, iodine pentafluoride, and tetrafluoroethylene wherein the mol ratio of iodine to iodine pentafluoride is at least 2:1 and the ratio of tetrafluorethylene to iodine pentafluoride is at least 5:1, the improvement which comprises conducting said reaction in the presence of a catalyst selected from the group consisting of antimony pentafluoride, antimony trifluoride, and anhydrous stannous fluoride.

6. The process of claim 5 wherein the catalyst is antimony pentafluoride.

7. The process of claim 5 wherein the catalyst is antimony trifluoride.

8. The process of claim 5 wherein the catalyst is anhydrous stannous fluoride.

9. In the reaction of iodine, iodine pentafluoride, and tetrafluoroethylene wherein the mole ratio of iodine to iodine pentafluoride is less than 2:1 and the ratio of tetrafluoroethylene to iodine pentafluoride is at least 1:1, the improvement which comprises conducting said reaction in the presence of a catalyst selected from the group consisting of antimony pentafluoride, antimony trifluoride, and anhydrous stannous fluoride.

10. The process of claim 9 wherein the catalyst is antimony pentafluoride.

11. The process of claim 9 wherein the catalyst is antimony trifluoride.

12. The process of claim 9 wherein the catalyst is anhydrous stannous fluoride.

References Cited in the file of this patent

UNITED STATES PATENTS

| | | |
|---|---|---|
| 2,614,131 | Simons et al. | Oct. 14, 1942 |
| 3,006,973 | Hauptschein et al. | Oct. 31, 1961 |

OTHER REFERENCES

Chambers et al.: J.C.S. (London), pp. 3779–86 (1961), QD 1 C6 (copy in Pat. Off. Sci. Lib.).